United States Patent [19]
Spinelli

[11] Patent Number: 5,447,128
[45] Date of Patent: Sep. 5, 1995

[54] CONVEYOR SLEEVE

[75] Inventor: Massimo Spinelli, Turin, Italy

[73] Assignee: SIGOM S.r.l., Venaria, Italy

[21] Appl. No.: 189,502

[22] Filed: Jan. 31, 1994

[30] Foreign Application Priority Data

Feb. 4, 1993 [IT] Italy .............................. TO93A0060

[51] Int. Cl.6 ............................................ F02M 29/00
[52] U.S. Cl. ........................... 123/184.21; 123/184.53
[58] Field of Search ......... 123/52 M, 52 MB, 52 MC, 123/184.21, 184.53

[56] References Cited

U.S. PATENT DOCUMENTS

| 4,492,212 | 1/1985 | Dooley | 123/52 M |
| 4,538,555 | 9/1985 | Kite | 123/52 M |
| 4,543,918 | 10/1985 | Ma | 123/52 MB |
| 4,664,076 | 5/1987 | Miyano et al. | 123/52 MB |
| 4,901,680 | 2/1990 | Matsumoto | 123/308 |
| 5,040,495 | 8/1991 | Harada et al. | 123/52 MB |
| 5,107,800 | 4/1992 | Araki et al. | 123/52 MB |
| 5,307,767 | 5/1994 | Schutz | 123/52 MB |

*Primary Examiner*—David A. Okonsky
*Attorney, Agent, or Firm*—Merchant, Gould, Smith, Edell, Welter & Schmidt

[57] ABSTRACT

A conveyor sleeve (6), in particular for conveying air into an internal combustion engine (2), of the kind for reducing resonance caused by air waves in the induction apparatus (1). The wall forming the sleeve (6) provides an alternate succession of star-shaped cross section portions (9) and circular cross section portions (11), said portions (9) being joined to said portions (11) by means of joining wall portions (12).

3 Claims, 2 Drawing Sheets

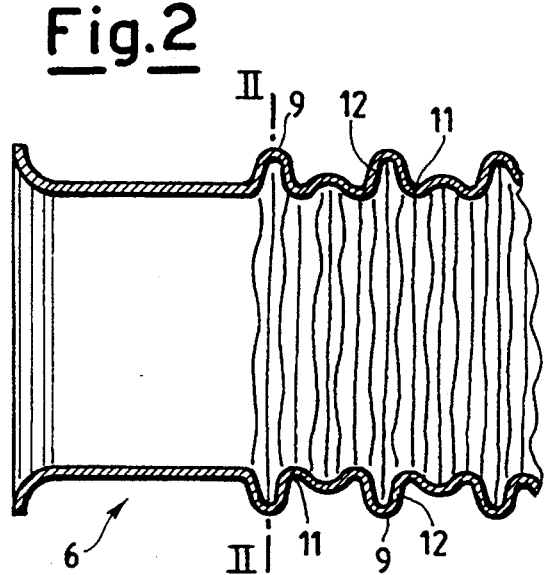
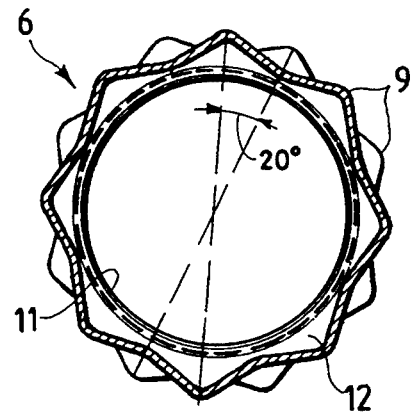
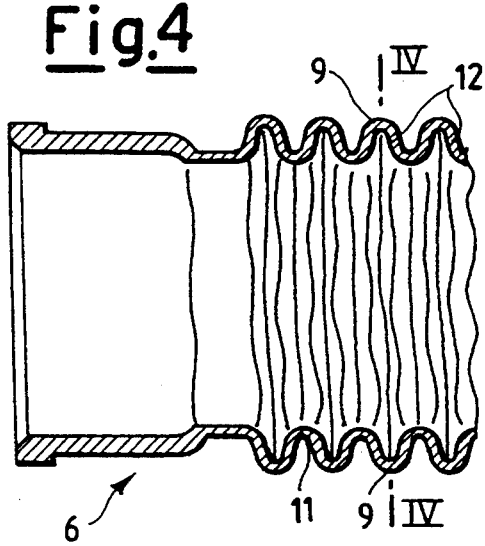
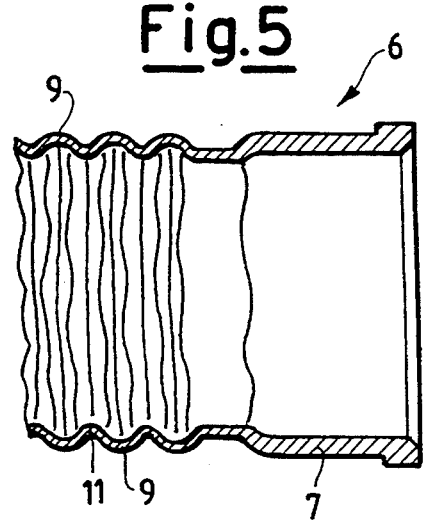
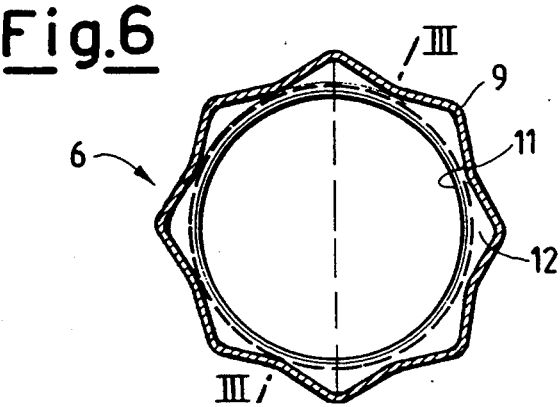

CONVEYOR SLEEVE

FIELD OF THE INVENTION

The present invention relates to a conveyor sleeve, particularly suitable to be used to convey air into induction systems of motorcar internal combustion engines. The conveyor sleeve has the function of reducing resonance caused by waves of air that is sucked.

BACKGROUND OF THE INVENTION

The problem of cutting down resonance in induction sleeves, in particular on motor vehicles, has become more important as the overall noise of the vehicle has decreased owing to continuous improvements. Therefore, all noises that could not be heard before because covered by other noises, at present have become unpleasant and therefore have to be reduced.

One of the systems that are known and utilised in the state of the art is that of manufacturing sleeves having honeycomb-like textile inserts fitted on the walls and coupled to plastic anticollapsing structures.

The aforesaid technique is rather complex and does not always give satisfactory results. Moreover, it has a considerably high cost.

SUMMARY OF THE INVENTION

It is an object of this invention to overcome the above cited inconveniences by providing a inexpensive sleeve having high soundproof power.

The above object is attained according to the invention by a conveyor sleeve, in particular for conveying air into an internal combustion engine, of the kind for reducing resonance caused by air waves in the induction apparatus, characterised in that the wall forming the sleeve provides an alternate succession of star-shaped cross section portions and circular cross section portions; the star portions are joined to the circular portions by means of joining wall portions.

BRIEF DESCRIPTION OF THE DRAWINGS

Further features and advantages will be more apparent hereinafter in the following description of two preferred but not-limiting embodiments of the sleeve according to the invention with reference to the accompanying drawings, in which:

FIG. 2 is a lengthwise partial sectional view of a first embodiment of the sleeve according to this invention;

FIG. 3 is a transverse sectional view on line II—II of the sleeve of FIG. 2;

FIG. 4 is a partial lengthwise sectional view of another embodiment of the sleeve according to the invention;

FIG. 5 is a lengthwise sectional view of the sleeve of FIG. 4 on line III—III of FIG. 6;

FIG. 6 is a transverse sectional view taken on line IV—IV of FIG. 4.

DETAILED DESCRIPTION OF THE PREFERRED EMBODIMENTS

Figure 1:
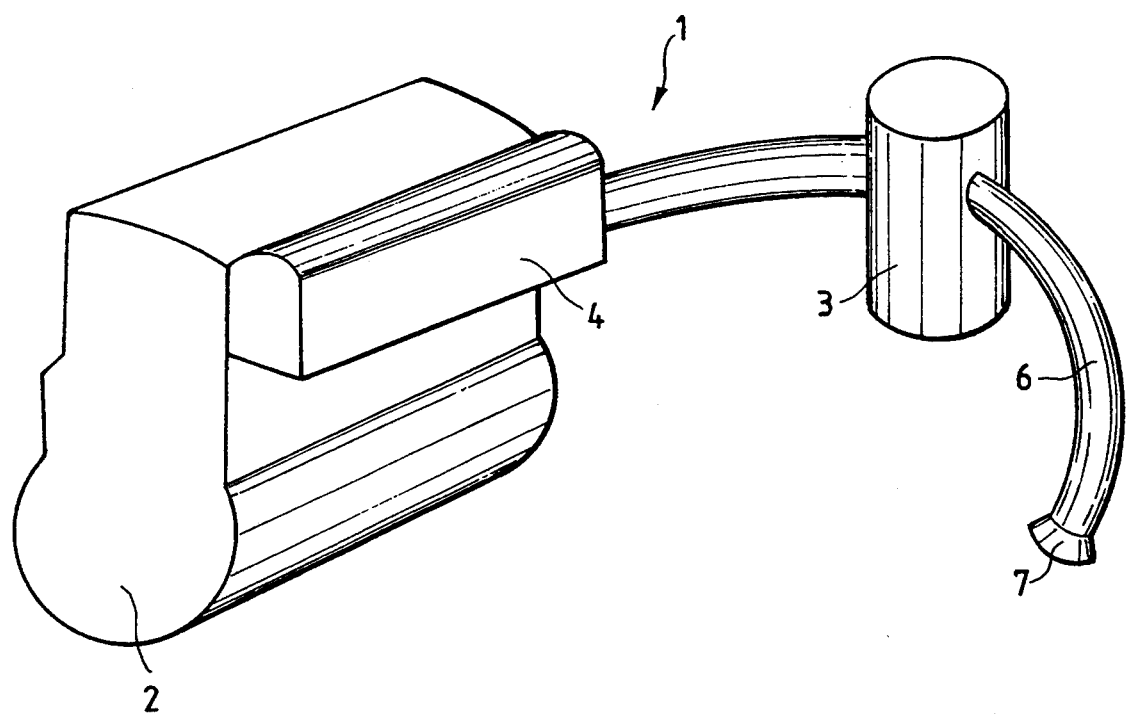
FIG. 1 is a schematic view of an induction system of an internal combustion engine provided with a sleeve according to this invention.

Referring to the drawings, numeral 1 indicates an air induction system of an internal combustion engine 2 provided with an air filter 3. The air filter 3 connects to an induction manifold 4.

The air filter 3 is also fitted with a sleeve 6 which connects to an air intake 7 located inside the engine housing in a suitable position.

According to the invention, the sleeve 6 consists of a plurality of star-shaped wall portions 9 disposed alternated with a plurality of circular shaped wall portions 11 joined therebetween by joining wall portions 12.

In the embodiment shown in FIGS. 4 to 6, the points of all of the star-shaped wall portions are all disposed in the same position relative to a vertical plane A passing through the centre of the conduit.

In the embodiment shown in FIGS. 2 and 3 differs from the foregoing embodiment only for the fact that each star-shaped portion following the first one is rotated, in this example of an arc of circle of 20° relative to the vertical plane A passing through the centre of the immediately preceding star-shaped wall portion. In this way, each star point is disposed aligned with the subsidence between two points of the adjacent star-shaped portion. The extension of the arc of circle will obviously vary according to particular requirements and the design of the conduit.

The so formed conduit appears like a multitude of small domes all connected to each other and forming the wall of the conduit. The domes are particularly efficient, according to the invention, in deadening resonance due to discontinuous flow of air, which is characteristic of induction conduits of internal combustion engines.

In one of the two illustrated embodiments, the domes are disposed in rows, while in the other embodiment they have a honeycomb disposition. It is to be understood, however, that the characteristics of the invention set forth in the foregoing description may be changed within the principles of the invention, as defined by the following claims.

I claim:

1. A conveyor sleeve for conveying air into an internal combustion engine for reducing resonance caused by air waves in an induction apparatus, wherein a wall forming the sleeve provides an alternate succession of star-shaped cross section portions and circular cross section portions, said star-shaped cross section portions being joined to said circular cross section portions by means of joining wall portions.

2. A conveyor sleeve according to claim 1, wherein at least one point of each said star-shaped cross section portion having star-shaped cross section lies in a vertical plane passing through the centre of said star-shaped cross section portions.

3. A convey sleeve according to claim 1, wherein each said star-shaped portion is rotated of an arc of circle relative to a vertical plane passing through the centre of the preceding star-shaped portion, whereby in its projection on the adjacent section, each star point is equally spaced apart from two points of the preceding section.

* * * * *